(12) United States Patent
Lee et al.

(10) Patent No.: US 11,415,999 B2
(45) Date of Patent: Aug. 16, 2022

(54) TRAVELING CONTROL SYSTEM AND METHOD OF AUTONOMOUS VEHICLE

(71) Applicants: Hyundai Motor Company, Seoul (KR); Kia Motors Corporation, Seoul (KR)

(72) Inventors: Kang Hoon Lee, Suwon-si (KR); Eun Jin Choi, Seoul (KR); Ji Un Kim, Anyang-si (KR); Hae Ryong Lee, Suwon-si (KR); Young Chul Oh, Seongnam-si (KR); Ki Cheol Shin, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 342 days.

(21) Appl. No.: 16/691,745

(22) Filed: Nov. 22, 2019

(65) Prior Publication Data
US 2020/0192396 A1 Jun. 18, 2020

(30) Foreign Application Priority Data
Dec. 18, 2018 (KR) .......................... 10-2018-0164532

(51) Int. Cl.
*G05D 1/02* (2020.01)
*G05D 1/00* (2006.01)
*G01S 17/931* (2020.01)

(52) U.S. Cl.
CPC .......... *G05D 1/0231* (2013.01); *G01S 17/931* (2020.01); *G05D 1/0088* (2013.01); *G05D 2201/0213* (2013.01)

(58) Field of Classification Search
None
See application file for complete search history.

(56) References Cited

U.S. PATENT DOCUMENTS 6,111,993 A * 8/2000 Matsunaga ............. G06T 7/168
382/103
9,567,004 B1 * 2/2017 Jhang ................... B62D 15/025
(Continued)

FOREIGN PATENT DOCUMENTS

| KR | 20180029627 A | * | 3/2018 |
| KR | 20180091357 A | | 8/2018 |

OTHER PUBLICATIONS

Machine translation of KR20180029627A (Year: 2018).*

*Primary Examiner* — Anne Marie Antonucci
*Assistant Examiner* — Kyle S Park
(74) *Attorney, Agent, or Firm* — Slater Matsil, LLP

(57) ABSTRACT

A traveling control system of an autonomous vehicle includes a 2D LIDAR sensor, a wheel speed sensor for detecting a speed of the vehicle, a yaw rate sensor for detecting a rotational angular speed of the vehicle, and an error corrector for determining a straight-line situation using a LIDAR point detected by the 2D LIDAR sensor, extracting a straight lateral distance value according to the result of determination, accumulating the LIDAR point according to the trajectory of traveling of the vehicle detected by the wheel speed sensor and the yaw rate sensor, estimating an error between the accumulated point and the extracted straight line, and calculating and feeding back an offset correction parameter of the yaw rate sensor when the estimated error value is greater than a predetermined threshold value to automatically correct an error parameter of the yaw rate sensor.

20 Claims, 15 Drawing Sheets

(56) References Cited

U.S. PATENT DOCUMENTS

| | | | |
|---|---|---|---|
| 2018/0224851 A1 | 8/2018 | Park | |
| 2018/0284292 A1* | 10/2018 | Ono | G01S 17/89 |
| 2020/0031352 A1* | 1/2020 | Takaki | B60W 30/09 |
| 2020/0189582 A1* | 6/2020 | Fukushige | B60W 10/18 |

* cited by examiner

TRAVELING CONTROL SYSTEM AND METHOD OF AUTONOMOUS VEHICLE

CROSS-REFERENCE TO RELATED APPLICATIONS

This application claims priority to Korean Patent Application No. 10-2018-0164532, filed on Dec. 18, 2018, which application is hereby incorporated herein by reference.

TECHNICAL FIELD

The present invention relates to a traveling control system of an autonomous vehicle.

BACKGROUND

In general, an autonomous vehicle (self-driving car) refers to a vehicle which grasps a situation using various sensors provided in the vehicle, such as a precise map and a global positioning system (GPS), and autonomously arrives at a destination without requiring a driver to operate a steering wheel, an accelerator pedal or a brake. In a strict sense, an autonomous vehicle is different from a driverless car which is driven in a state in which a person does not ride in the car, but is actually being used interchangeably therewith.

In order to realize such an autonomous vehicle, many technologies for automatically maintaining a distance between vehicles, such as highway driving assist (HAD) technology, a lane departure warning system (LDWS), a lane keeping assist system (LKAS), a blind spot detection (BSD) system, advanced smart cruise control (ASCC), and an automatic emergency braking (AEB) system are required, but an autonomous traveling control system is also one of the most important technologies.

In order to stably drive the autonomous vehicle, it is necessary to accurately recognize the position information of the vehicle. Therefore, in a conventional autonomous vehicle, an inertial navigation system (INS) for fusing a global positioning system (GPS) signal and a corrected signal using a virtual reference system (VRS) and integrating inertial measurement unit (IMU) information is used.

However, in order to realize a navigation system using this method, expensive equipment is required. Therefore, Korean Patent Laid-Open Publication No. 10-2018-0391357 (Aug. 16, 2018) and U.S. counterpart application publication 2018/0224851 disclose a control method and apparatus of an autonomous vehicle using dead reckoning navigation capable of efficiently controlling (e.g., emergency stop) the autonomous vehicle in an abnormal situation in which the judgment/planning/decision function of the autonomous system and/or the navigation system does not properly operate.

In the related art, when the position information of the vehicle is recognized, a precise position is found through a map matching algorithm using a precise map composed of lanes and road edges (curbs or buildings) established by precise pre-measurement and data of sensors (a camera, a LIDAR, a GPS) mounted in the autonomous vehicle.

However, in the related art, when the position information of the vehicle is recognized, for example, if a road surface is discolored or precise position estimation using lane or LIDAR data cannot be performed at a complicated intersection, an error may occur in tracking of a trajectory of traveling due to an error occurring in dead reckoning navigation.

For example, in an autonomous traveling situation, since route generation and determination of a degree of risk are performed using the precise map, when precise position recognition is wrong, an error may occur in route generation and determination of the degree of risk. Due to such an error, although the autonomous vehicle should normally travel in a straight direction, the autonomous vehicle may be controlled to be shifted to one side according to a position estimated through dead reckoning navigation. This is because the traveling angle of the vehicle is incorrectly measured due to an error occurring in a yaw rate sensor.

In conventional dead reckoning navigation, when an error occurs in the yaw rate sensor, since the position of the vehicle tends to be shifted on the precise map, the generated route is corrected to perform control such that the vehicle moves to the left.

In addition, although the vehicle is located at a position desired by the driver, since the route is generated based on the precise map in dead reckoning navigation, the vehicle may be controlled to be shifted in an incorrect direction. Therefore, it is important to correct the error of the yaw rate sensor which affects the traveling direction (heading angle) in the conventional dead reckoning navigation.

In addition, the same problems as the above description may occur when a sensor offset error varies according to the mounting position of the yaw rate sensor and the number of passengers or when an error of the yaw rate sensor measured when the vehicle stops and an error of the yaw rate sensor measured while the vehicle travels are different from each other.

SUMMARY

The present invention relates to a traveling control system of an autonomous vehicle and, in particular embodiments, to a traveling control system and method of an autonomous vehicle capable of automatically correcting an error occurring in a yaw rate sensor while the autonomous vehicle travels.

Accordingly, embodiments of the present invention can provide a traveling control system and method of an autonomous vehicle that substantially obviate one or more problems due to limitations and disadvantages of the related art.

Embodiments of the present invention provide a traveling control system and method of an autonomous vehicle capable of automatically correcting an error occurring in a yaw rate sensor while the autonomous vehicle travels.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

As embodied and broadly described herein, a traveling control system of an autonomous vehicle includes a two-dimensional (2D) LIDAR sensor configured to detect a distance, a direction, a speed and a material distribution of an object around a certain vehicle, a wheel speed sensor configured to detect a speed of the vehicle, a yaw rate sensor configured to detect a rotational angular speed of the vehicle, and an error corrector configured to determine a straight-line situation using a LIDAR point detected by the 2D LIDAR sensor, to extract a straight lateral distance value according to the result of determination, to accumulate LIDAR points according to the trajectory of traveling of the vehicle detected by the wheel speed sensor and the yaw rate sensor, to estimate an error between the accumulated point and the extracted straight line, and to calculate and feed back an offset correction parameter of the yaw rate sensor when the estimated error value is greater than a predetermined threshold value to automatically correct an error parameter of the yaw rate sensor.

In another aspect of the present invention, a traveling control method of an autonomous vehicle includes detecting a distance, a direction, a speed and a material distribution of an object around a certain vehicle, detecting a speed and a rotational angular speed of the vehicle, determining a straight-line situation using a LIDAR point and extracting a straight lateral distance value according to the result of determination, accumulating the LIDAR point according to the trajectory of traveling including the speed and angular speed of the vehicle, estimating an error between the accumulated point and the extracted straight line, determining whether a value of the estimated error is less than a predetermined threshold value, and calculating and feeding an offset correction parameter of the yaw rate sensor for detecting the rotational angular speed back to the accumulating of the LIDAR point upon determining that the value of the estimated error is greater than the predetermined threshold value to automatically correct an error parameter of a yaw rate sensor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF ILLUSTRATIVE EMBODIMENTS

Figure 1:
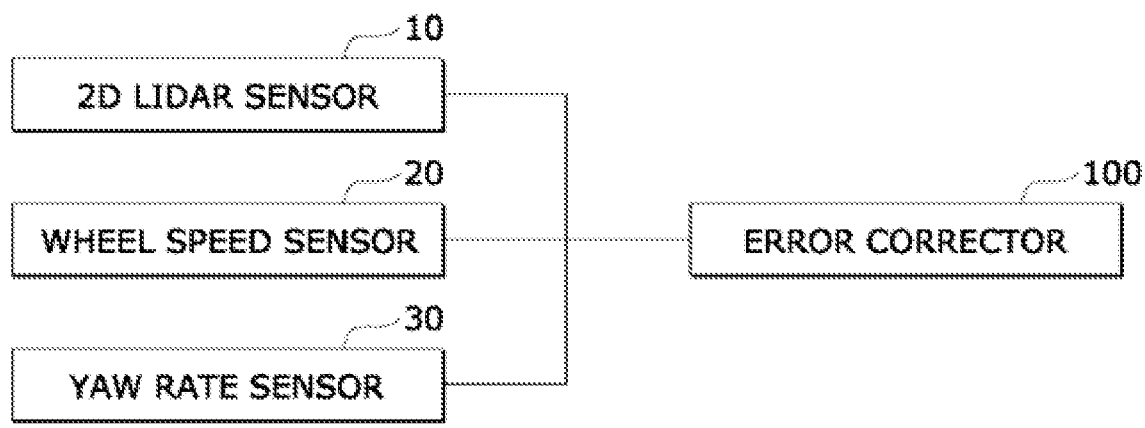
FIG. 1 is a block diagram showing a traveling control system of an autonomous vehicle according to an embodiment of the present invention.

Hereinafter, the embodiments of the present invention will be described in detail with reference to the accompanying drawings so as to be easily implemented by those skilled in the art. However, the present invention may be variously implemented and is not limited to the embodiments described herein. In the drawings, in order to clearly describe the present invention, portions which are not related to the description of the present invention will be omitted and similar portions are denoted by similar reference numerals throughout the specification.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software or a combination thereof.

Throughout the specification, when a certain portion "includes" a certain component, this indicates that the other components are not excluded, but may be further included unless specially described. The same reference numbers will be used throughout the drawings to refer to the same or like parts.

Hereinafter, the configuration and control procedure of a traveling control system of an autonomous vehicle according to an embodiment of the present invention will be described in detail with reference to FIGS. 1 to 13.

FIG. 1 is a block diagram showing a traveling control system of an autonomous vehicle according to an embodiment of the present invention. Referring to FIG. 1, the traveling control system of the autonomous vehicle according to the embodiment of the present invention includes a two-dimensional (2D) LIDAR sensor 10 for detecting a distance, a direction, a speed and a material distribution by emitting pulse lasers to objects around the vehicle and measuring a time required to return light and a strength thereof; wheel speed sensors 20 respectively provided in four wheels of the vehicle to detect the rotation speeds of the wheels by change in magnetic force line in a sensor and a tone wheel; a yaw rate sensor 30 for detecting a rotational angular speed of the vehicle in a vertical axis direction; and an error corrector 100 for determining a straight-line situation using a LIDAR point detected by the 2D LIDAR sensor 10, extracting a straight lateral distance value according to the result of determination, accumulating a LIDAR point according to the trajectory of traveling of the vehicle detected by the wheel speed sensors 20 and the yaw rate sensor 30, estimating an error between the accumulated point and the extracted straight line, and feeding back an offset correction parameter of the yaw rate sensor 30 to automatically correct the error parameter of the yaw rate sensor 30.

Here, LIDAR is an abbreviation of light detection and ranging or laser imaging detection and ranging and detects a direction, a speed and a material distribution by emitting pulse lasers to a target and measuring a time required to return light and a strength thereof. LIDAR collects the result of operation in a so-called "point cloud" after performing operation. The cloud operates in real time as a three-dimensional map of the real world.

A high-precision map configured by the LIDAR not only shows where an object is located but also enables the object to be identified. In addition, the LIDAR not only enables topographic exploration but also enables mapping of non-metallic objects, rocks, rain, clouds, aerosols and even single molecules.

In addition, the wheel speed sensors are respectively provided in the four wheels and serve to detect the rotation speeds of the wheels by change in magnetic force line in the sensor and the tone wheel and to input the rotation speeds to a computer. At the time of quick braking or braking on a slippery road surface, the computer controls brake hydraulic pressure to ensure controllability and to shorten a stopping distance.

In addition, the yaw rate sensor detects rotational angular speed in the vertical axis direction of the vehicle. When an AC voltage is applied to a vibrator, vibration is generated due to deformation. As a result, the vibrator always vibrates from side to side with a certain number of vibrations. In this state, when rotating at a certain angular speed, the principle of outputting an AC voltage while being tilted at a right angle from a direction in which vibration is applied by Coriolis force.

Figure 2:
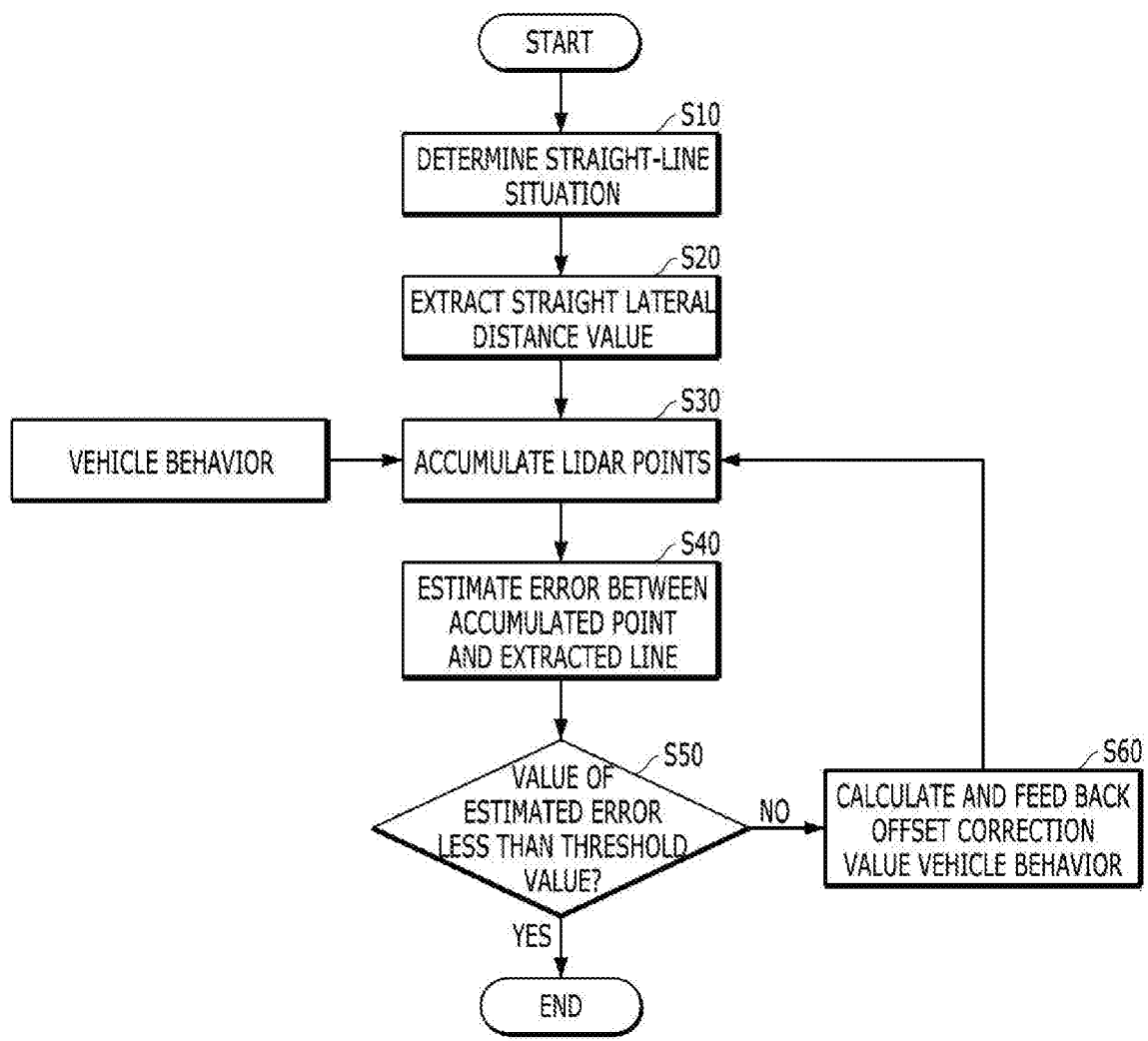
FIG. 2 is a flowchart illustrating a traveling control method of an autonomous vehicle according to an embodiment of the present invention.

FIG. 2 is a flowchart illustrating a traveling control method of an autonomous vehicle according to an embodiment of the present invention.

Referring to FIG. 2, the error corrector 100 determines a straight-line situation using the LIDAR point detected by the 2D LIDAR sensor 10 and extracts a straight lateral distance according to the result of determination (S20).

In the embodiment of the present invention, in steps S10 and S20, straight traveling determination and straight offset detection may be performed using the following three methods.

(1) First Straight Traveling Determination and Straight Offset Detection Method

Figure 3A:
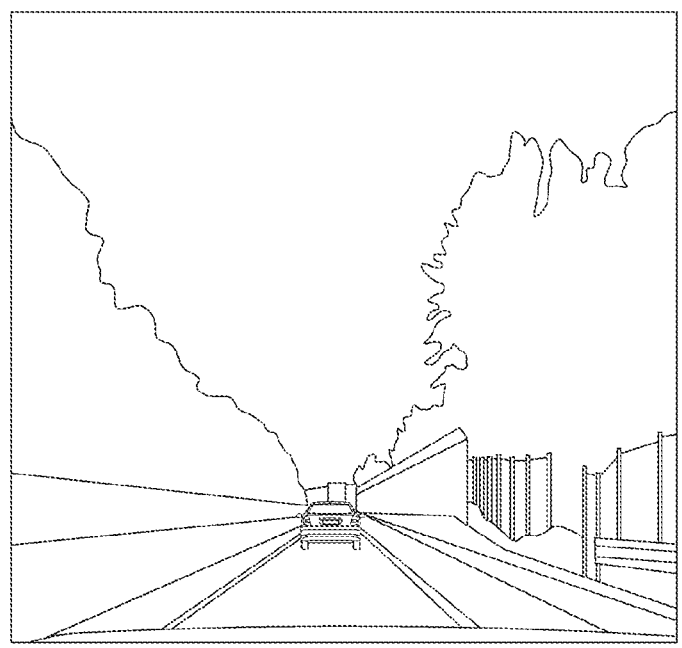
FIGS. 3A to 3C are views illustrating a straight traveling determination and straight offset detection operation in a traveling control system of an autonomous vehicle according to an embodiment of the present invention.
Figure 3B:
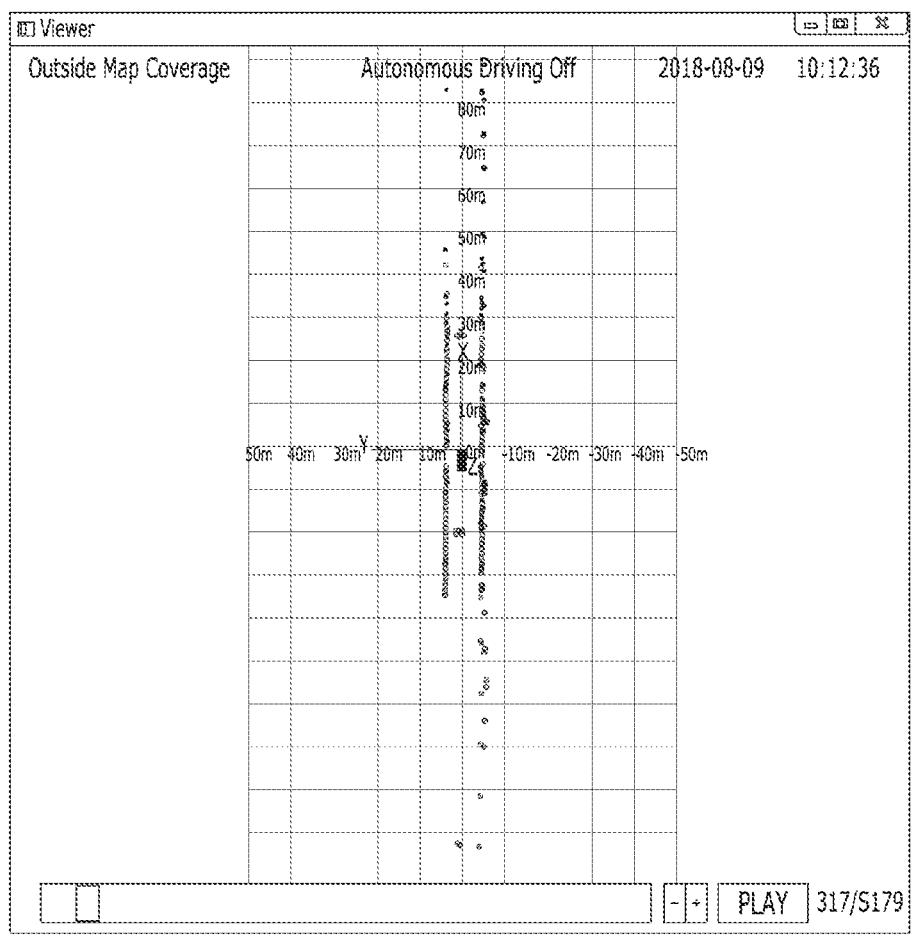
Figure 3C:
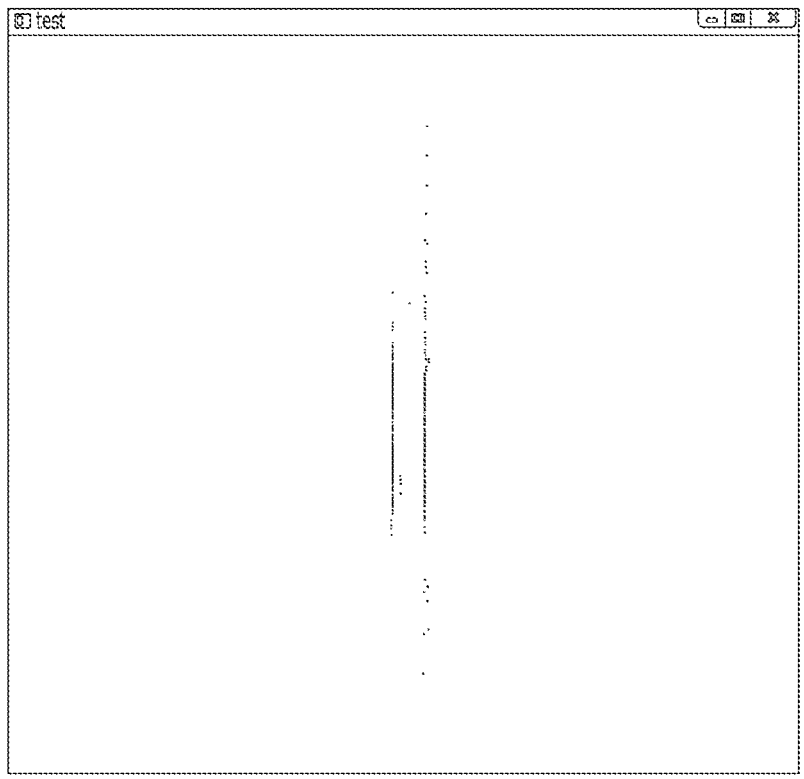

The error corrector 100 may detect a straight component based on Hough transform, as shown in FIGS. 3A to 3C. At this time, theta may be fixed to 90 degrees and only the same straight-line component as a traveling direction may be detected. It is preferable to extract a component of a line having a certain length (e.g., 50 m) or more and to calculate accuracy of the extracted straight line (least square) using a surrounding LIDAR point.

In addition, it is preferable to extract a line offset value with respect to the straight-line component having a least square error having a certain value or less.

In addition, if the same lateral offset is detected during a certain time T, it is preferable to determine a long straight line section.

Figure 4:
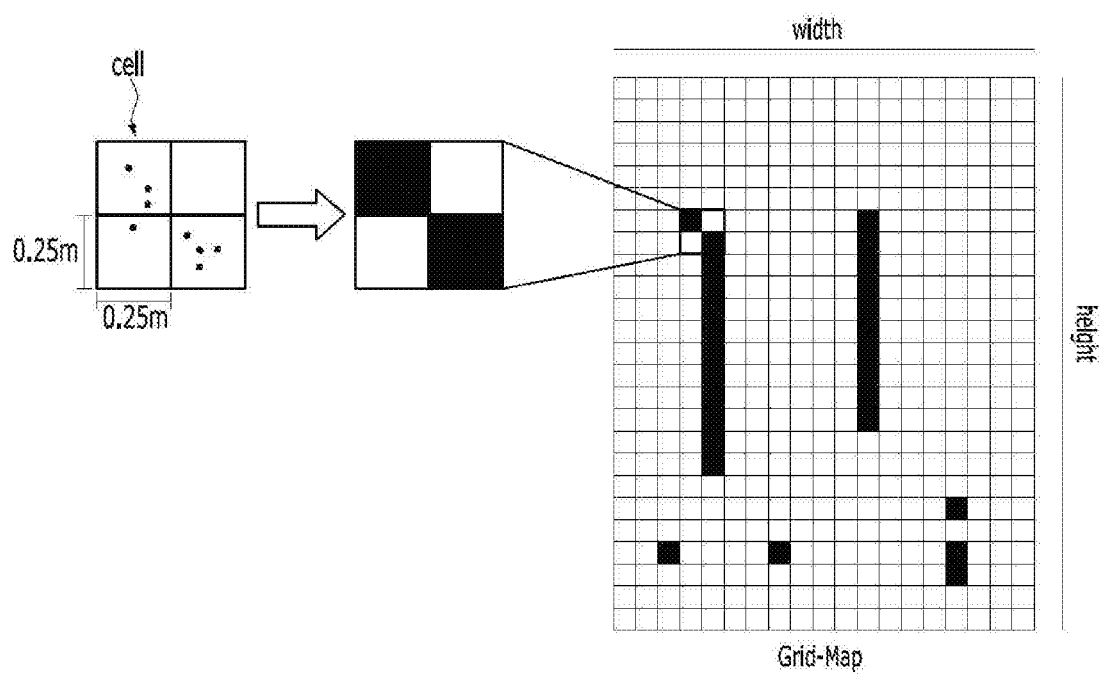
FIGS. 4 to 6 are views illustrating a straight traveling determination and straight offset detection operation using a grid map in a traveling control system of an autonomous vehicle according to an embodiment of the present invention.

(2) Second Straight Traveling Determination and Straight Offset Detection Method The error corrector 100 may generate a grid map in units of cells having a certain size using the LIDAR point and detect a straight-line component, in order to rapidly detect the straight-line component, as shown in FIG. 4.

For example, the error corrector wo assigns a LIDAR point present within a certain area 100 m×100 m to a grid-shaped cell (0.25 m×0.25 m) and determines that the cell is valid when the number of points in the cell is equal to or greater than a certain value.

(3) Third Straight Traveling Determination and Straight Offset Detection Method

Figure 5:
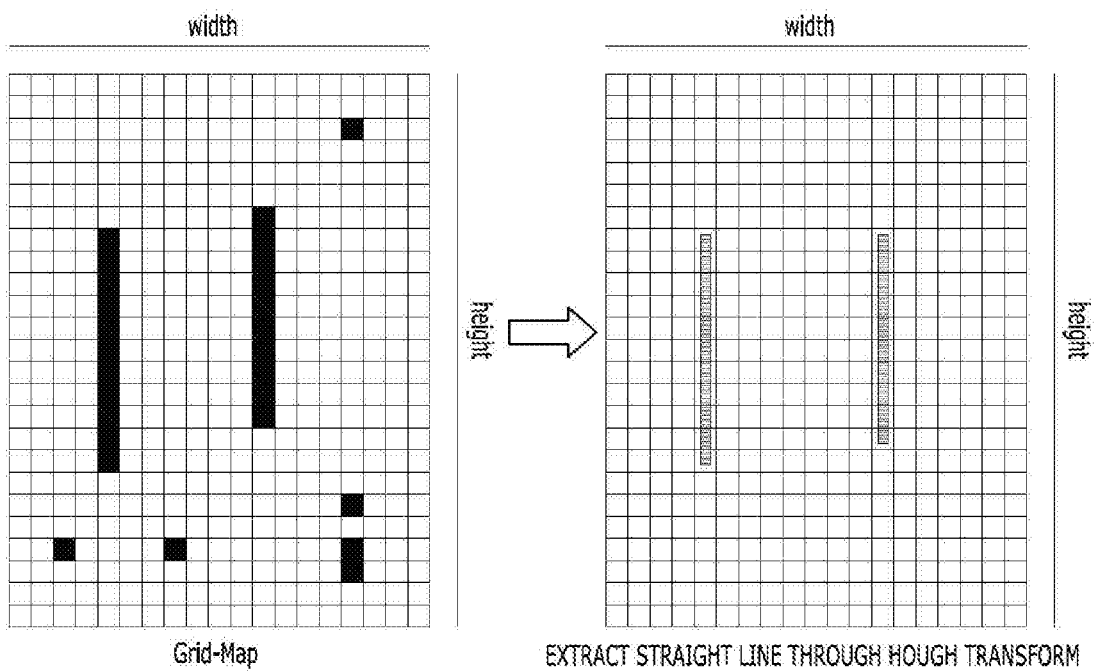
Figure 6:
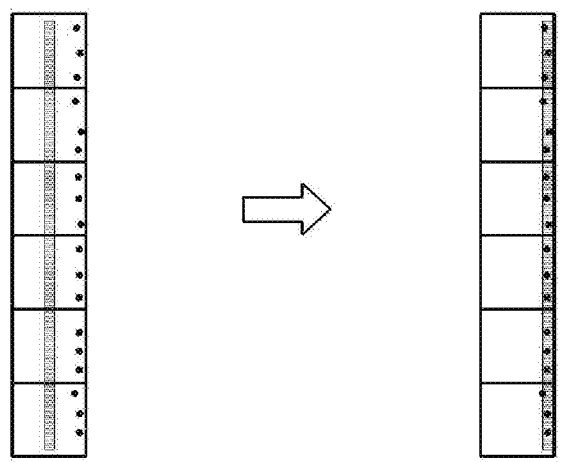

The error corrector 100 may detect the straight-line component using Hough transform as shown in FIG. 5. At this time, it is possible to apply Hough transform which detects the straight-line component based on the generated grid map (image).

Here, it is preferable to rapidly search for an equation for finding a straight line in the finite form of (r, theta) using Hough transform.

At this time, in order to improve accuracy of the extracted straight-line component, the straight-line component extracted using Hough transform has an error corresponding to a cell (0.25 m×0.25 m), and the position of the straight line may be accurately readjusted using the point around the extracted line.

Figure 7:
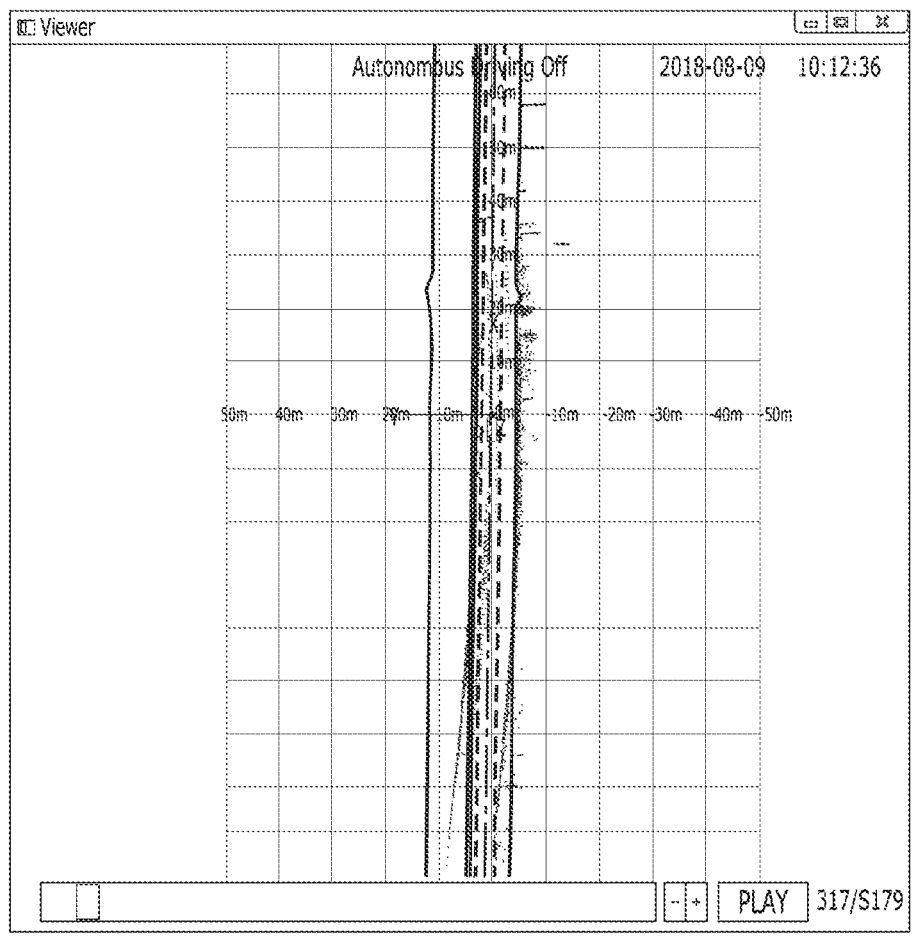
FIG. 7 is a view illustrating operation of accumulating a LIDAR point in a traveling control system of an autonomous vehicle according to an embodiment of the present invention.

Subsequently, the error corrector 100 accumulates LIDAR points according to the trajectory of traveling of the vehicle as shown in FIG. 7 (S30).

Here, the error corrector 100 compensates for the LIDAR point of a previous frame by the amount of movement corresponding to a predetermined reception period (e.g., 80 ms) using subject-vehicle behavior information (speed and rotation information) detected by the wheel speed sensors 20 and the yaw rate sensor 30 provided in the vehicle and accumulates the LIDAR points, thereby solving divergence of the point position error as an accumulation time increases, due to the error of the yaw rate sensor 30.

Figure 8:
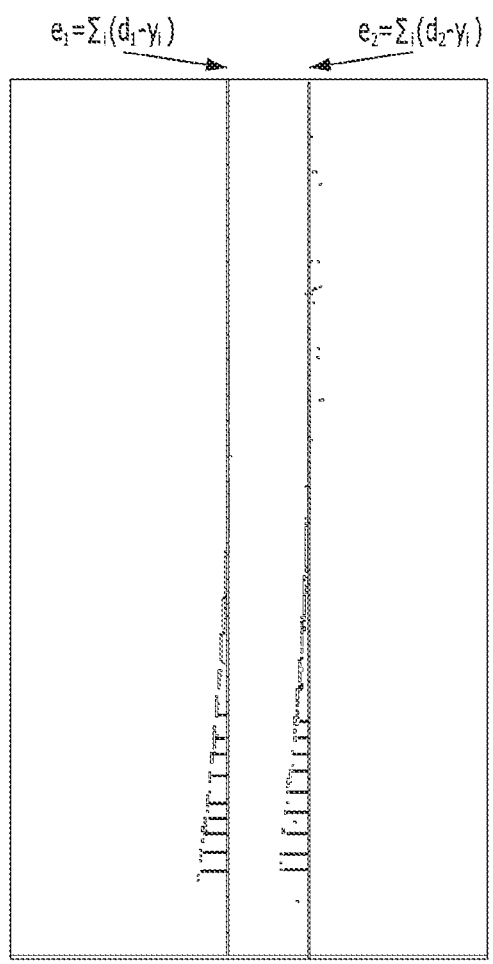
FIG. 8 is a view illustrating operation of calculating an error in a traveling control system of an autonomous vehicle according to an embodiment of the present invention.

Subsequently, the error corrector 100 estimates an error between the accumulated point and the extracted straight line as shown in FIG. 8 (S40). That is, the error corrector 100 calculates the error value of the accumulated LIDAR point from the offset of the extracted straight-line component. It is preferable to feed back an offset correction value and to perform recalculation, such that the error value is less than a threshold value.

Subsequently, the error corrector 100 determines whether the value of the estimated error is less than a predetermined threshold value (S50), finishes the method upon determining that the value of the estimated error is less than the predetermined threshold value, and calculates and feeds an offset correction parameter of the yaw rate sensor for detecting the rotational angular speed back to the step of accumulating the LIDAR point (S60) upon determining that the value of the estimated error is greater than the predetermined threshold value, thereby automatically correcting the error parameter of the yaw rate sensor 30.

Figure 9:
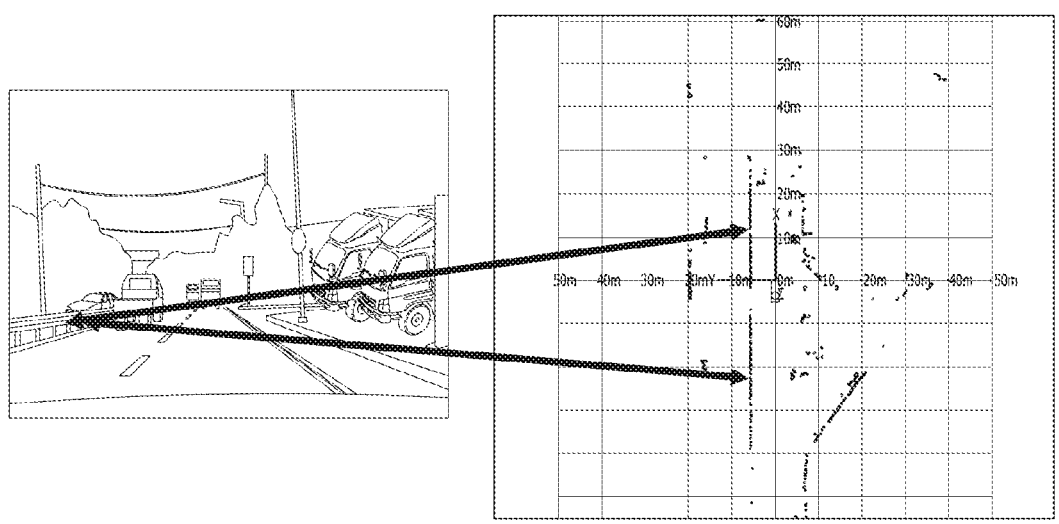
FIGS. 9 to 13 are views illustrating in a traveling control procedure of an autonomous vehicle according to an embodiment of the present invention.
Figure 10:
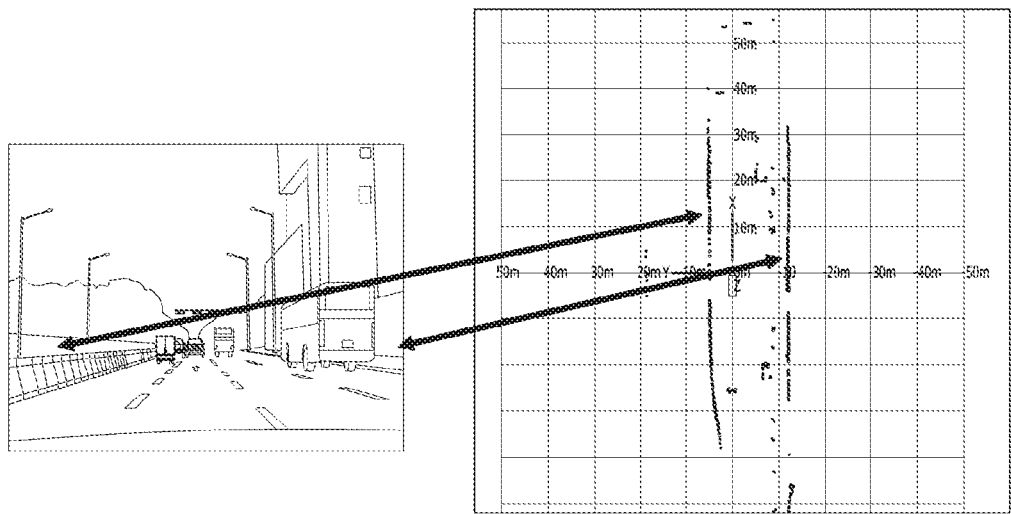
Figure 11:
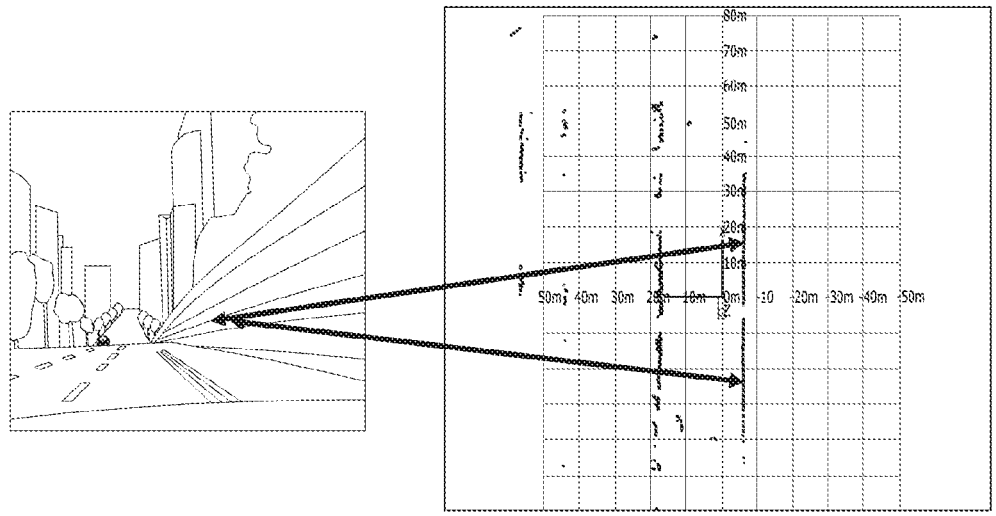
Figure 12:
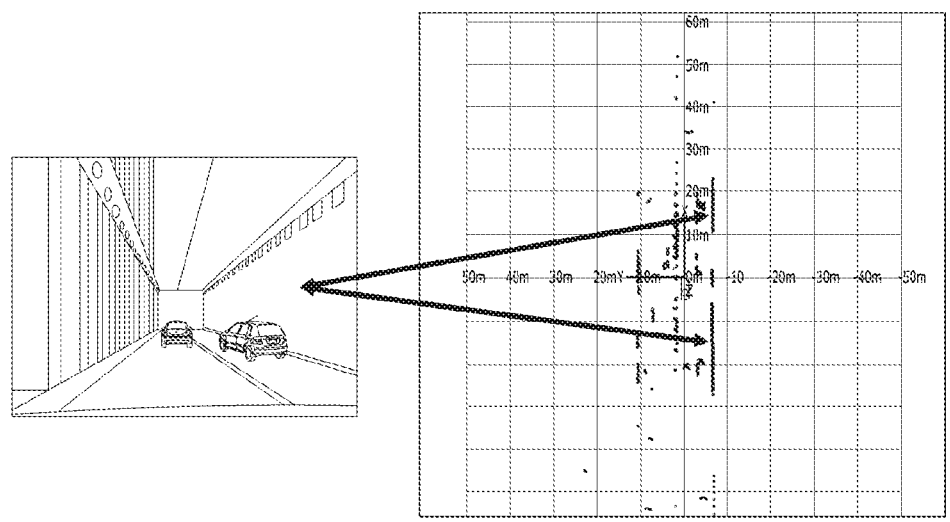
Figure 13:
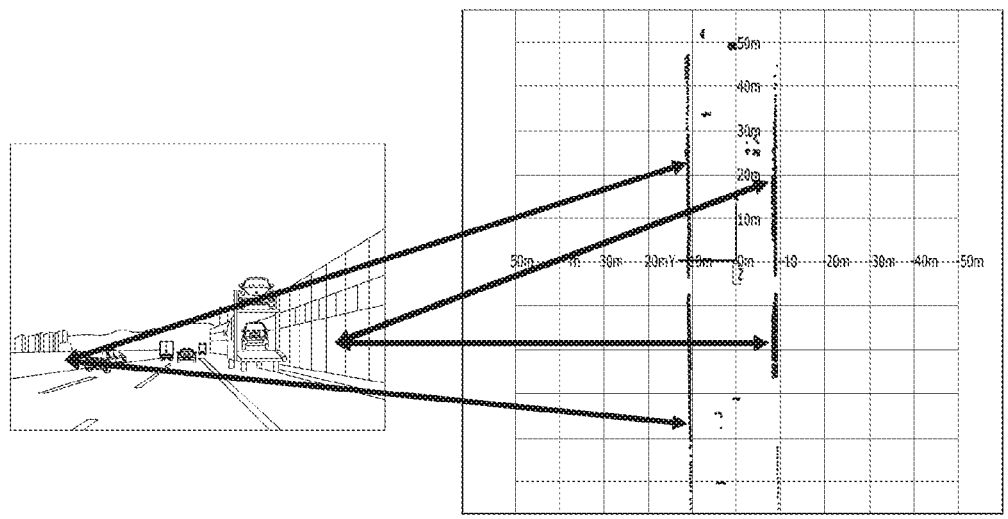

FIG. 9 illustrates an example of a situation in which straight traveling determination is possible when a vehicle travels along a center guardrail, FIGS. 10 and 11 illustrates an example of a situation in which straight traveling determination is possible when a vehicle travels along a building wall, FIG. 12 is an example of a situation in which straight traveling determination is possible when a vehicle travels through a tunnel, and FIG. 13 is an example of a situation in which straight traveling determination is possible when a vehicle travels along a center guardrail and a soundproof wall.

According to a traveling control system and method of an autonomous vehicle of the present invention, it is possible to automatically correct an error occurring in a yaw rate sensor while the autonomous vehicle travels. Therefore, it is possible to improve performance of dead reckoning navigation performed to control traveling of the vehicle.

In addition, it is possible to correct the error of the yaw rate sensor regardless of vehicle model or the mounting position of a sensor and to calculate the error of the yaw rate sensor even when the vehicle travels.

The invention can also be embodied as computer readable code on a computer readable recording medium. The computer readable recording medium is any data storage device that can store data which can thereafter be read by a computer system that includes a processor. Examples of the computer readable recording medium include read-only memory (ROM), random-access memory (RAM), CD-ROMs, magnetic tapes, floppy disks, optical data storage devices, and carrier waves (such as data transmission over the Internet).

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A traveling control system of an autonomous vehicle, the traveling control system comprising:
    a two-dimensional (2D) LIDAR sensor configured to detect a distance, a direction, a speed and a material distribution of an object around the autonomous vehicle;
    a wheel speed sensor configured to detect a speed of the autonomous vehicle;
    a yaw rate sensor configured to detect a rotational angular speed of the autonomous vehicle; and
    an error corrector configured to determine a straight-line situation using a LIDAR point detected by the 2D LIDAR sensor, to extract a straight lateral distance value according to a result of the determination, to accumulate LIDAR points according to a trajectory of traveling of the autonomous vehicle detected by the wheel speed sensor and the yaw rate sensor, to estimate an error between the accumulated point and the extracted straight line, and to calculate and feed back an offset correction parameter of the yaw rate sensor when a value of the estimated error is greater than a predetermined threshold value to automatically correct an error parameter of the yaw rate sensor, wherein the error corrector is configured to compensate for the LIDAR point of a previous frame by an amount of movement corresponding to a predetermined reception period using behavior information of the autonomous vehicle as detected by the wheel speed sensor and the yaw rate sensor and to accumulate the LIDAR points.

2. The traveling control system according to claim 1, wherein the error corrector is configured to determine the straight-line situation based on Hough transform, wherein a theta is fixed to 90 degrees, and wherein only the same straight-line component as a traveling direction is detected.

3. The traveling control system according to claim 1, wherein the error corrector is configured to determine the straight-line situation based on Hough transform.

4. The traveling control system according to claim 1, wherein the error corrector is configured to generate a grid map in units of cells having a certain size using the LIDAR point and to detect a straight-line component.

5. The traveling control system according to claim 1, wherein the error corrector is implemented by hardware.

6. The traveling control system according to claim 1, wherein the error corrector is implemented by a processor executing software.

7. The traveling control system according to claim 1, wherein the error corrector is implemented by a combination of hardware and software.

8. A traveling control method of an autonomous vehicle, the traveling control method comprising:
    detecting a distance, a direction, a speed and a material distribution of an object around the autonomous vehicle;
    detecting a speed and a rotational angular speed of the autonomous vehicle;
    determining a straight-line situation using a LIDAR point and extracting a straight lateral distance value according to a result of the determining;
    accumulating the LIDAR point according to a trajectory of traveling including the speed and angular speed of the autonomous vehicle;
    estimating an error between the accumulated point and the extracted straight line;
    determining whether a value of the estimated error is less than a predetermined threshold value;
    calculating and feeding an offset correction parameter of a yaw rate sensor for detecting the rotational angular speed back to the accumulating of the LIDAR point upon determining that the value of the estimated error is greater than the predetermined threshold value to automatically correct an error parameter of the yaw rate sensor; and
    controlling movement of the autonomous vehicle based on the corrected error parameter of the yaw rate sensor;
    wherein accumulating the LIDAR point according to a trajectory of traveling comprises compensating for the LIDAR point of a previous frame by an amount of movement corresponding to a predetermined reception period using behavior information of the autonomous vehicle as detected by a wheel speed sensor and the yaw rate sensor and accumulating the LIDAR points.

9. The traveling control method according to claim 8, wherein determining the straight-line situation using the LIDAR point comprises determining the straight-line situation based on Hough transform, wherein a theta is fixed to 90 degrees, and wherein only the same straight-line component as a traveling direction is detected.

10. The traveling control method according to claim 9, wherein detecting only the same straight-line component as the traveling direction comprises extracting a component of a line having a predetermined length or more and calculating accuracy of straight line using the LIDAR point around the extracted straight line.

11. The traveling control method according to claim 8, wherein determining the straight-line situation using the LIDAR point comprises generating a grid map in units of cells having a certain size using the LIDAR point and detecting a straight-line component.

12. The traveling control method according to claim 9, wherein determining the straight-line situation using the LIDAR point comprises extracting a straight-line component based on Hough transform, the straight-line component having an error corresponding to a cell having a predetermined size and accurately readjusting a position of the straight-line using a point around the extracted line.

13. A non-transitory computer-readable recording medium having recorded thereon a program for executing the method according to claim 8.

14. The traveling control method according to claim 8, wherein detecting the distance, the direction, the speed and the material distribution of the object comprises sensing the distance, the direction, the speed and the material distribution of the object using a two-dimensional LIDAR sensor.

15. The traveling control method according to claim 8, wherein detecting the speed of the autonomous vehicle comprises sensing the speed using the wheel speed sensor and wherein detecting the rotational angular speed of the autonomous vehicle comprises sensing the rotational angular speed using the yaw rate sensor.

16. An autonomous vehicle comprising:
a two-dimensional (2D) LIDAR sensor;
a wheel speed sensor;
a yaw rate sensor;
a processor; and
a non-transitory computer-readable recording medium coupled to the processor, the computer-readable recording medium storing a program to cause the processor to execute a method comprising:
receiving a distance, a direction, a speed and a material distribution of an object around the autonomous vehicle from the 2D LIDAR sensor;
receiving a speed of the autonomous vehicle from the wheel speed sensor;
receiving a rotational angular speed of the autonomous vehicle from the yaw rate sensor;
determining a straight-line situation using a LIDAR point and extracting a straight lateral distance value according to a result of the determining;
accumulating the LIDAR point according to a trajectory of traveling including the speed and angular speed of the autonomous vehicle;
estimating an error between the accumulated point and the extracted straight line;
determining whether a value of the estimated error is less than a predetermined threshold value; and
calculating and feeding an offset correction parameter of the yaw rate sensor for detecting the rotational angular speed back to the accumulating of the LIDAR point upon determining that the value of the estimated error is greater than the predetermined threshold value to automatically correct an error parameter of the yaw rate sensor,
wherein accumulating the LIDAR point according to a trajectory of traveling comprises compensating for the LIDAR point of a previous frame by an amount of movement corresponding to a predetermined reception period using behavior information of the autonomous vehicle as detected by the wheel speed sensor and the yaw rate sensor and accumulating the LIDAR points.

17. The autonomous vehicle according to claim 16, wherein determining the straight-line situation using the LIDAR point comprises determining the straight-line situation based on Hough transform, wherein a theta is fixed to 90 degrees, and wherein only the same straight-line component as a traveling direction is detected.

18. The autonomous vehicle according to claim 17, wherein detecting only the same straight-line component as the traveling direction comprises extracting a component of a line having a predetermined length or more and calculating accuracy of straight line using the LIDAR point around the extracted straight line.

19. The autonomous vehicle according to claim 16, wherein determining the straight-line situation using the LIDAR point comprises generating a grid map in units of cells having a certain size using the LIDAR point and detecting a straight-line component.

20. The autonomous vehicle according to claim 16, wherein determining the straight-line situation using the LIDAR point comprises extracting a straight-line component based on Hough transform, the straight-line component having an error corresponding to a cell having a predetermined size and accurately readjusting a position of the straight-line using a point around the extracted line.

* * * * *